United States Patent
Kakihara et al.

(10) Patent No.: US 10,622,928 B2
(45) Date of Patent: Apr. 14, 2020

(54) LINEAR MOTOR, LINEAR MOTOR CONTROL APPARATUS, AND LINEAR MOTOR CONTROL METHOD

(71) Applicant: Kabushiki Kaisha Yaskawa Denki, Kitakyushu-shi (JP)

(72) Inventors: Masanobu Kakihara, Kitakyushu (JP); Shogo Makino, Kitakyushu (JP); Toru Shikayama, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 841 days.

(21) Appl. No.: 15/067,299

(22) Filed: Mar. 11, 2016

(65) Prior Publication Data
US 2016/0268883 A1    Sep. 15, 2016

(30) Foreign Application Priority Data
Mar. 12, 2015 (JP) ................. 2015-049857

(51) Int. Cl.
| H02K 19/02 | (2006.01) |
| H02K 1/18 | (2006.01) |
| H02P 21/22 | (2016.01) |
| H02P 25/064 | (2016.01) |
| H02P 6/00 | (2016.01) |
| H02K 41/03 | (2006.01) |
| H02P 21/06 | (2016.01) |

(52) U.S. Cl.
CPC ......... *H02P 25/064* (2016.02); *H02K 41/033* (2013.01); *H02P 6/006* (2013.01); *H02P 21/06* (2013.01)

(58) Field of Classification Search
CPC .................. H02K 21/12; H02P 6/20
See application file for complete search history.

(56) References Cited

U.S. PATENT DOCUMENTS

| 2008/0185932 A1 | 8/2008 | Jajtic et al. |
| 2013/0015726 A1* | 1/2013 | Trammell ............ H02K 41/031 |
| | | 310/12.26 |
| 2013/0049488 A1* | 2/2013 | Makin et al. |

FOREIGN PATENT DOCUMENTS

| JP | 7-99767 A | 4/1995 |
| JP | 2006-109639 A | 4/2006 |
| JP | 2009-509490 A | 3/2009 |
| JP | 2009-195104 A | 8/2009 |
| JP | 2009-195104 A5 | 8/2009 |
| JP | 2009-195104 A6 | 8/2009 |
| JP | 2015-12661 A | 1/2015 |

OTHER PUBLICATIONS

Japanese Office Action dated Aug. 1, 2017 in Japanese Patent Application No. 2015-049857.

* cited by examiner

*Primary Examiner* — Jorge L Carrasquillo
*Assistant Examiner* — Charles S Laughlin
(74) *Attorney, Agent, or Firm* — Oblon, McClelland, Maier & Neustadt, L.L.P.

(57) ABSTRACT

This disclosure discloses a linear motor including a stator and a mover including a field magnet and an armature winding. The mover includes a mover iron core including a plurality of teeth around each of which the armature winding is wound. Some or all of the plurality of teeth include a first hole formed in a slot housing the armature winding.

18 Claims, 11 Drawing Sheets

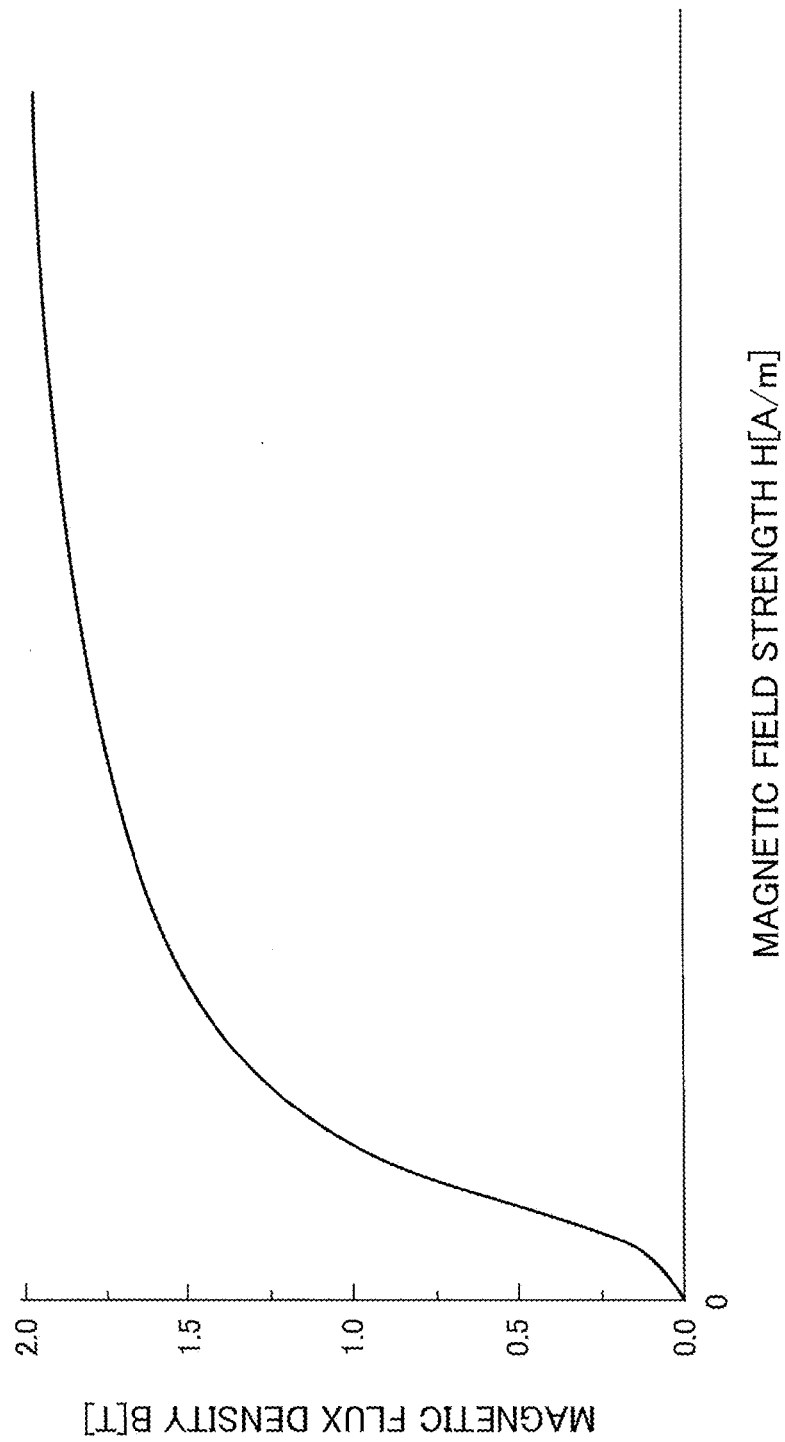

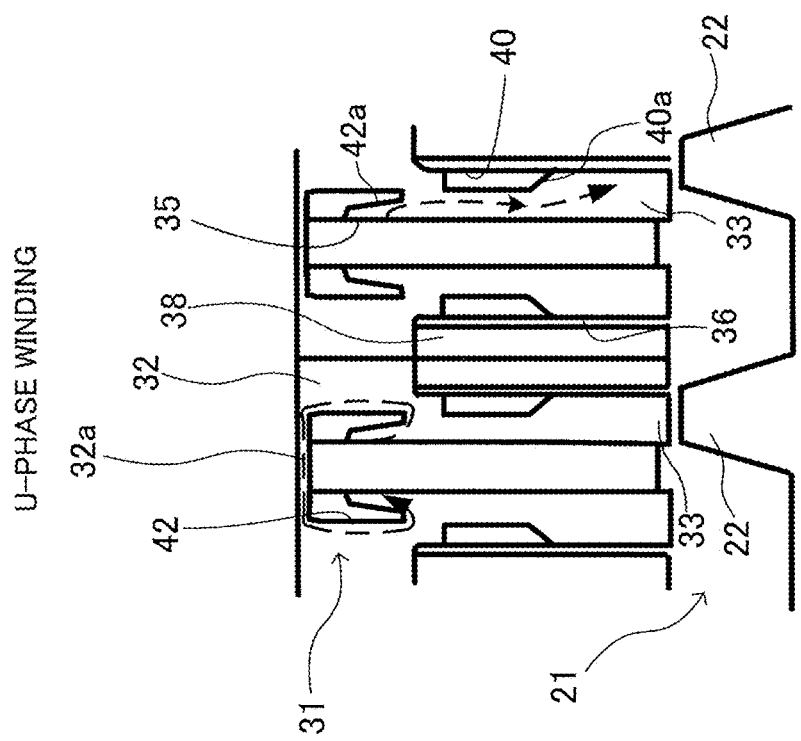

| TYPE | SUB-TEETH | TEETH WITH HOLES | COGGING THRUST [Np-p] |
|---|---|---|---|
| A | NONE | ALL TEETH | 25.2 |
| B | PRESENT | ALL TEETH INCLUDING SUB-TEETH | 7.2 |
| C | PRESENT | ALL TEETH EXCLUDING SUB-TEETH | 4.9 |

LINEAR MOTOR, LINEAR MOTOR CONTROL APPARATUS, AND LINEAR MOTOR CONTROL METHOD

CROSS-REFERENCE TO RELATED APPLICATIONS

The present application is based upon and claims the benefit of priority to Japanese Patent Application No. 2015-049857, filed Mar. 12, 2015, the entire contents of which are incorporated herein by reference.

BACKGROUND OF THE INVENTION

Field Of The Invention

The embodiment disclosed herein relates to a linear motor, a linear motor control apparatus, and a linear motor control method.

Description Of Background Art

A teeth module for primary-side magnetic pole members of permanent magnet excited electric machines such as a linear motor is known.

SUMMARY OF INVENTION

According to one aspect of the disclosure, there is provided a linear motor including a stator and a mover including a field magnet and an armature winding. The mover includes a mover iron core including a plurality of teeth around each of which the armature winding is wound. Some or all of the plurality of teeth include a first hole formed in a slot housing the armature winding.

BRIEF DESCRIPTION OF THE DRAWINGS

FIG. 7 is a view showing an example of B-H curve of a general electromagnetic steel sheet.

FIG. 8 is an explanatory view of part of functions of holes when U-phase coincides with d-axis in the unloaded state.

DETAILED DESCRIPTION OF THE EMBODIMENTS

An embodiment will now be described with reference to the drawings. Although in the following, directions such as top, bottom, left, and right may appropriately be used for convenience purposes in describing configurations of a linear motor, etc. those terms do not intend to limit the positional relationships between the configurations of the linear motor, etc.

<1. Configuration of Linear Motor>

Figure 1:
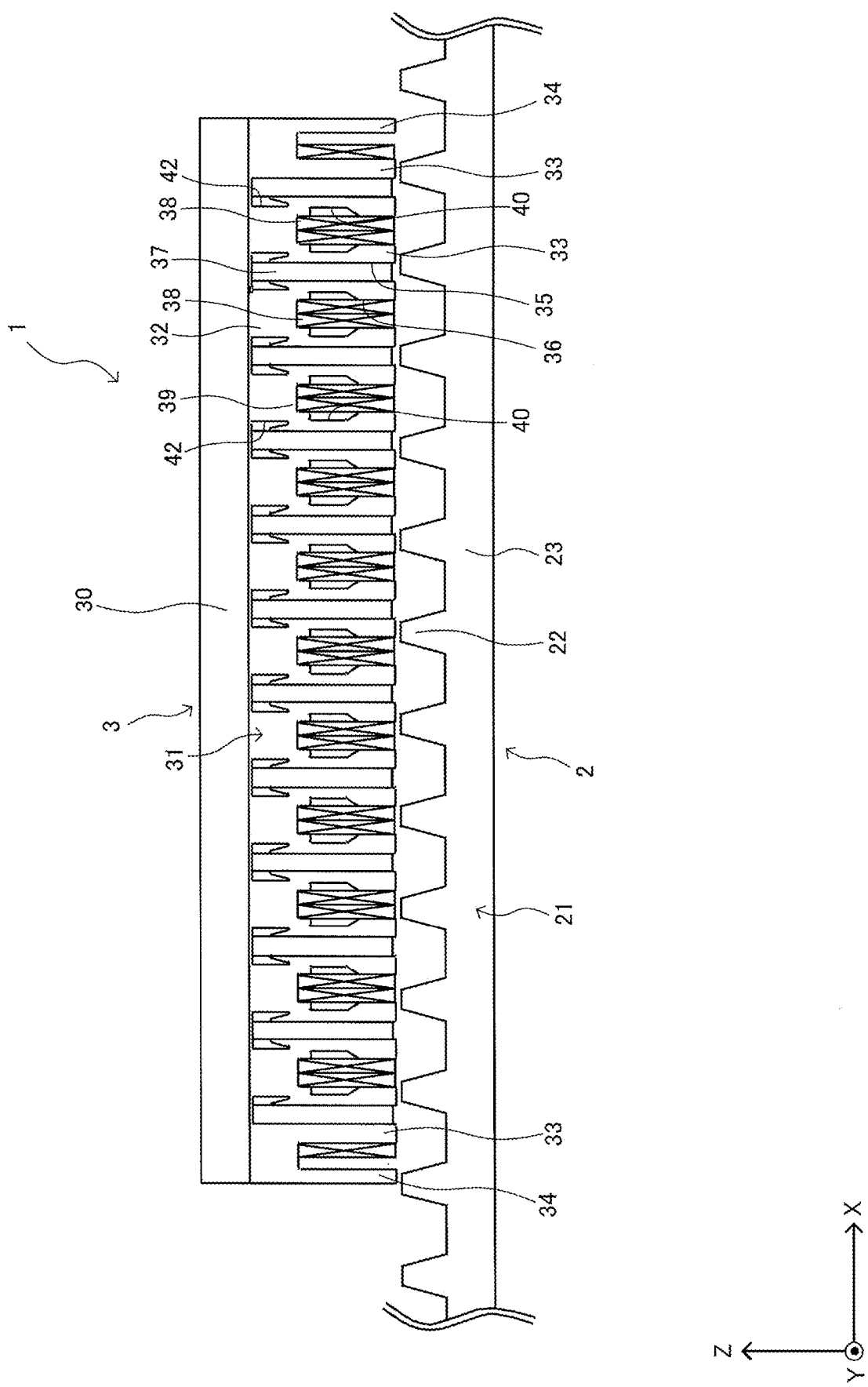
FIG. 1 is a sectional view in a moving direction, showing an example of the overall configuration of a linear motor according to an embodiment.
Figure 2:
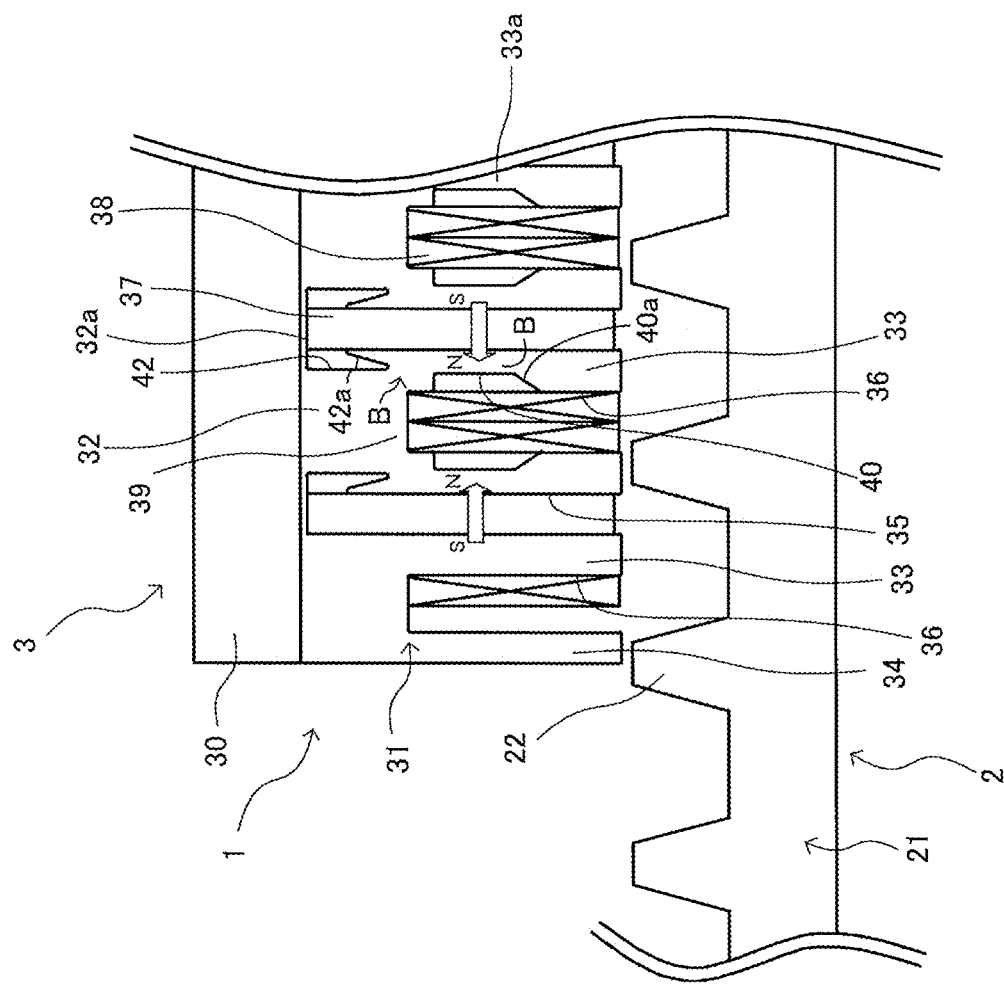
FIG. 2 is an enlarged sectional view, showing part of the linear motor in an enlarged manner.

Referring to FIGS. 1 and 2, an example of the overall configuration of a linear motor 1 according to this embodiment will be described.

As shown in FIG. 1, the linear motor 1 includes a stator 2, and a mover 3 moving in a moving direction (a positive direction or a negative direction of X-axis shown in FIG. 1). The linear motor 1 has field magnets 37 and armature windings 38 disposed on the mover 3 and is a linear motor adapted for long-stroke transportation purposes for example. Although the case where the linear motor 1 is a flux switching motor will be described as an example below, this is not limitative. For example, the linear motor 1 may be an inductor linear motor such as a magna gap motor or a high density (HD) motor.

<1-1. Configuration of Stator>

As shown in FIG. 1, the stator 2 includes a stator iron core 21 having a plurality of stator teeth 22 (an example of stator teeth). The stator iron core 21 is formed, for example, from a plurality of electromagnetic steel sheets laminated in a direction of lamination (Y-axis direction shown in FIG. 1). The stator iron core 21 has an elongated stator base 23 extending in the moving direction of the mover 3, with the plurality of stator teeth 22 being disposed on the stator base 23 at predetermined intervals along the moving direction. Each stator tooth 22 is formed into a shape (e.g., a trapezoid) protruding from the stator base 23 toward the mover 3.

<1-2. Configuration of Mover>

As shown in FIGS. 1 and 2, the mover 3 includes a base 30 arranged along the moving direction, a mover iron core 31 disposed on the base 30, and a plurality of the field magnets 37 and an equal number of the armature windings 38, disposed on the mover iron core 31. The mover iron core 31 is formed, for example, from a plurality of electromagnetic steel sheets laminated in the direction of lamination.

The mover iron core 32 includes a yoke 32, a plurality of teeth 33, and two sub-teeth 34. The plurality of teeth 33 are disposed on the base 30 toward the stator 2 along the moving direction and the two sub-teeth are disposed on the base 30 at both ends of the plurality of teeth 33 along the moving direction. The teeth 33 and the sub-teeth 34 are of shapes protruding from the yoke 32 toward the stator 2 and face the stator teeth 22 with a magnetic gap defined therebetween. The sub-teeth 34 have each a width along the moving direction smaller than that of each of the teeth 3. The yoke 32 is disposed on the base 30 toward the stator 2 and connects adjoining ones of the plurality of teeth and the tooth 33 and the sub-tooth 34 (via bridges 32a) at positions opposite to the stator 2.

The tooth 33 has at its approximately center in the moving direction a magnet insertion hole 35 of a approximately rectangular shape extending along a magnetic gap direction (Z-direction shown in FIG. 3) from an end of the tooth 33 closer to the stator 2 toward the yoke 32. The magnet insertion hole 35 is a through-hole extending through the mover iron core 31 in the width direction (Y-axis direction). A slot 36 is formed between the adjoining teeth 33 and between the adjoining tooth 33 and sub-tooth 34, the slot 36 housing the armature winding 38 wound around the tooth 33.

The field magnet 37 is inserted in and fixed via e.g., an adhesive to the magnet insertion hole 35. As shown in FIG. 2, if the field magnets adjoining in the moving direction are regarded as pairs, the two field magnets 37 are magnetized such that their facing surfaces form magnetic poles of the same polarity, i.e. N-pole or S-pole (N-pole in the example shown in FIG. 2). As a result, magnetic pole portions 39 of N-pole or S-pole are alternately formed along the moving direction between the adjoining teeth 33. The armature winding 38 is wound only around the tooth 33 but is not wound around the sub-tooth 34. The armature winding 38 wound around the tooth 33 is received in the slot 36 and is molded together with the tooth 33 by a resin not shown.

The tooth 33 has in its both side surfaces in the moving direction a first hole 40 communicating with the slot 36. The first hole 40 extends through the mover iron core 31 in the width direction (Y-axis direction). The first hole 40 is formed apart from an end of the tooth 33 toward the stator 2. In the slots 36 on both sides of the tooth 33 adjoining the sub-tooth 34, the first hole 40 is formed only in the slot 36 opposite to the sub-tooth 34 and is not formed in the slot 36 toward the sub-tooth 34.

The first hole 40 may be referred to as a concave that is recessed in the moving direction. That is, by forming the concave on both sides, the tooth 33 can have at its intermediate portion in the magnetic gap direction a thin tooth portion 33a having a cross-sectional area smaller than that at the end toward the stator 2. This thin tooth portion 33a has a width in the moving direction smaller than that of the tooth 33 toward the stator. The width in the moving direction of the tooth 33 adjoining the sub-tooth 34 is equal to or larger than the width in the moving direction of the tooth 33 not adjoining the sub-tooth 34.

The first hole 40 is sized and shaped such that in a non-energized state of the armature winding 38, the tooth 33 facing the stator tooth 22 of the stator 2 in the magnetic gap direction is magnetically saturated by the field magnet 37 at the position where the first hole 40 is formed.

In this example, the first hole 40 is of a approximately trapezoidal shape elongated in the magnetic gap direction, with its one edge 40a closer to the stator 2 being tilted such that the width of the tooth 33 in the moving direction increases toward the stator 2. Such a shape facilitates induction of a main magnetic flux from the field magnet 37 toward the stator 2 (see FIG. 8 described later).

The yoke 32 has a second hole 42 leading to the magnet insertion hole 35, formed on at least one side of the magnet insertion hole 35 in the moving direction. The second hole 42 extends through the mover iron core 31 in the width direction thereof (Y-axis direction). It is to be noted as to the magnet insertion hole 3 5 of the tooth 33 adjoining the sub-tooth 34 that the second hole 42 is formed only on the opposite side to the sub-tooth 34 and that the second hole 42 is not formed on the side of the sub-tooth 34.

The second hole 42 is sized and shaped such that in the non-energized state of the armature winding 38, the tooth 33 facing the stator tooth 22 of the stator 2 in the magnetic gap direction is magnetically saturated by the field magnet 37 at a portion (portion B shown in FIG. 2) between the second hole 42 and the first hole 40 (or may be the slot 36).

In this example, the second hole 42 is of a approximately trapezoidal shape elongated in the magnetic gap direction, with an edge 42a of the second hole 42 closer to the stator 2 being tilted such that the second hole 42 decreases in width toward the stator 2. Such a shape facilitates induction of a main magnetic flux from the field magnet 37 toward the stator 2 (see FIG. 8 described later).

Although FIGS. 1 and 2 show as an example the case where the yoke 32, the plurality of teeth 33, and the plurality of sub-teeth 34 are integrally formed on the mover iron core 31, the mover iron core 31 may be dividable for each of the teeth for example.

<2. Specific Example of Sensorless Control>

Figure 3:
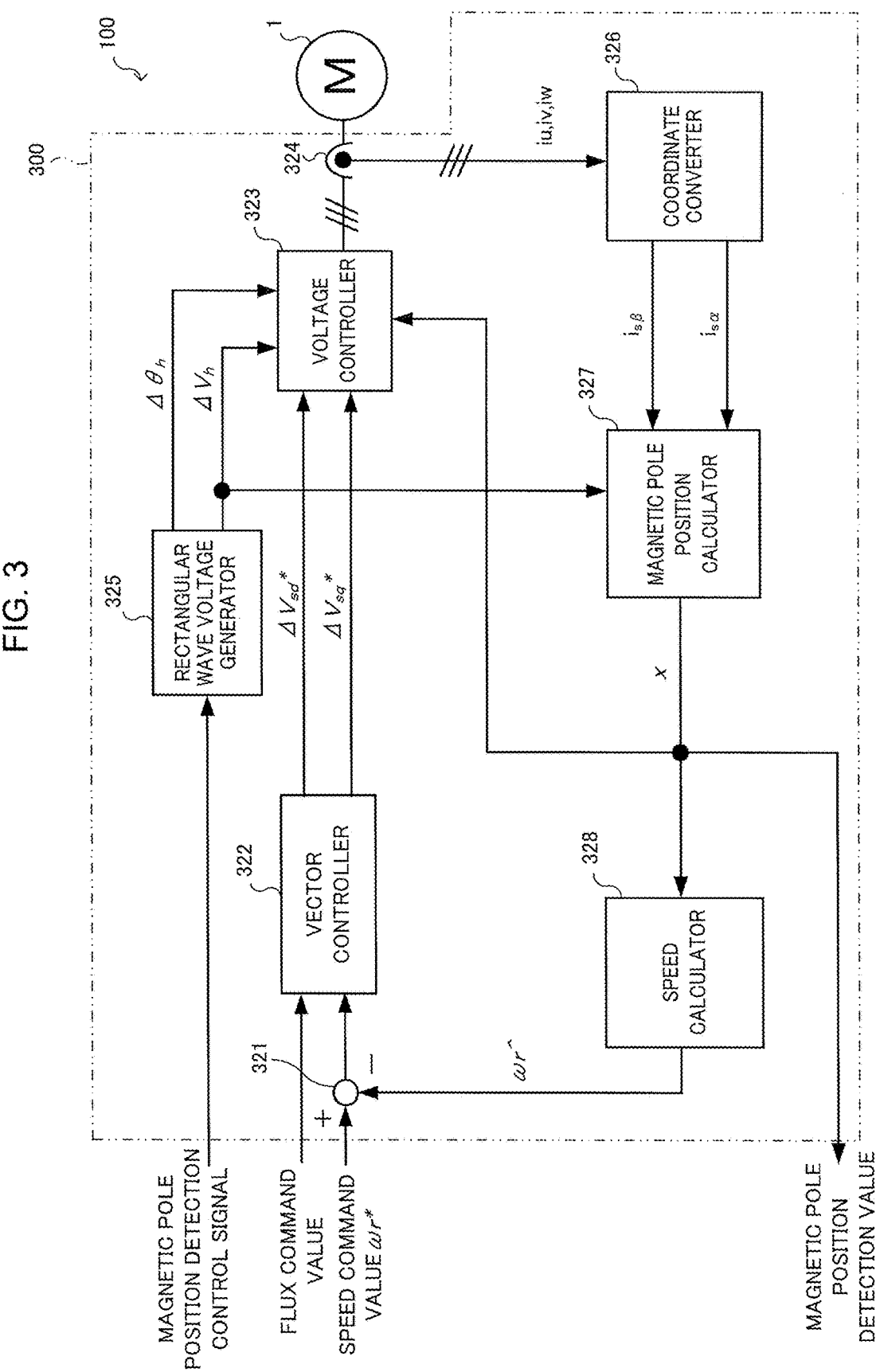
FIG. 3 is a block diagram showing a functional configuration of a control system and a control apparatus performing a sensorless control.

FIG. 3 shows an example of a linear motor control system 100 and control apparatus 300 performing speed control through sensorless control for the linear motor 1. A function block diagram shown in FIG. 3 is expressed in a transfer function form. In FIG. 3, the control system 100 includes the linear motor 1 and the control apparatus 300. The control apparatus 300 imparts a high-frequency voltage to either d-axis or q-axis or to both d-axis and q-axis and imparts a load current to q-axis. Hereinafter, an example implemented in the function block will be described more specifically.

The control apparatus 300 includes a subtracter 321, a vector controller 322, a voltage controller 323, a current detector 324, a rectangular wave voltage generator 325, a coordinate converter 326, a magnetic pole position calculator 327, and a speed calculator 328.

In FIG. 3, a flux command value and a speed command value ωr* for control of the drive of the linear motor 1 are input from a host control apparatus not shown. The speed command value ωr* is subjected by the subtracter 321 to calculation of a deviation from a speed estimated value ωr^ that will be described later. This deviation and the flux command value are input to the vector controller 322. The vector controller 322 defines a flux component (d-axis component) and a torque component (q-axis component) of the motor current so that the speed estimated value ωr^ coincides with the speed command value ωr* irrespective of the load state. The vector controller 322 outputs voltage command values for control of the speed and current of the linear motor 1 as 2-phase voltage command values ΔVsd*, ΔVsq* in a rotation orthogonal coordinate system (d-q axes coordinate system). This enables the control apparatus 300 to perform drive control of the linear motor 1 at any speed and a torque corresponding thereto (position control is also performed but is not shown).

On the other hand, a magnetic pole position detection control signal is input from a host control apparatus not shown to the rectangular wave voltage generator 325. The rectangular wave voltage generator 325 (an example of a high-frequency voltage imparting part) inputting the magnetic pole position detection control signal outputs a voltage command ΔVh and a phase command Δθh at a rectangular wave voltage (an example of the high-frequency voltage) of an optionally set time period. By superimposing these voltage command ΔVh and phase command Δθh on the above voltage command value ΔVsd* within the voltage controller 323, a high-frequency voltage is imparted to d-axis. In this manner, the voltage controller 323 operates the amplitude and phase of a voltage to be output to the linear motor 1.

The current detector 324 detects a current input to the linear motor 1 as three-phase current values iu, iv, and iw. The coordinate converter 326 converts these three-phase current values iu, iv, and iw into two-phase current values isα and isβ. These two-phase current values isα and isβ are current values of axes in an orthogonal coordinate system having α-axis as a reference axis representing u-phase and β-axis orthogonal thereto. If there is a deviation between inductances of d-axis and q-axis of the linear motor 1, that is, if that linear motor 1 has a magnetic saliency, the amplitudes of these two-phase current values isα and isβ contain information on magnetic pole positions x. While referring to the voltage command ΔVh output from the rectangular wave voltage generator 325, the magnetic pole position calculator 327 calculates and outputs a magnetic pole position x of the linear motor 1 based on the two-phase current values isα and isβ. Detailed description of a technique to calculate this magnetic pole position x will be omitted herein.

A magnetic position signal x output from the magnetic pole position calculator 327 is input to both the voltage controller 323 and the speed calculator 328. The speed calculator 328 performs a differential calculation of the magnetic pole position x to calculate an estimated speed ωr^ of the linear motor 1. This speed estimated value ωr^ is subtracted from the speed command value ωr* by the subtracter 321 to calculate a deviation, which in turn is utilized for a speed feedback. Although not shown in particular, the magnetic pole position x can be regarded as a rotational position of the linear motor 1 with U-phase as a reference so that position feedback control utilizing this magnetic pole position signal x is performed within the host control apparatus. Thus, in order to detect the magnetic pole position x of the linear motor 1 at a high accuracy, the linear motor 1 is required to have a high magnetic saliency.

Although in the above, rectangular wave voltages as exploration signals are superimposed on d-axis (voltage command values ΔVsd*) with load alternating currents being input to only q-axis components (only flux components being input to d-axis components), this is not limitative. The load alternating currents should be input to only q-axis components, but the exploration signals may superimposedly be input to q-axis or both d-axis and q-axis. However, superimposition of high-frequency voltage signals onto q-axis causes a reduction in the voltage required for the drive or a torque pulsation, and therefore it is desirable that the exploration signals be superimposedly input to only d-axis if possible. The d-axis and q-axis inductances of the linear motor 1 are not inductances for fundamental currents, but refer to high-frequency inductances defined from the high-frequency superimposed voltage signals and currents corresponding thereto. In the following description, the high-frequency inductances are referred to simply as inductances.

The processes, etc., effected in the voltage controller 323, the rectangular wave voltage generator 325, etc., are not limited to the examples of sharing of these processes. For example, the processes, etc., may be performed by a single processing part or may be performed by a further subdivided processing part. As for the control apparatus 300, only a part (inverter, etc.) of the rectangular wave voltage generator 325 supplying a driving electric power to the linear motor 1 may be implemented by an actual apparatus, while the other functions may be implemented by a program executed by a CPU 901 (see FIG. 11) that will be described later. Parts or all of the voltage controller 323 and rectangular wave voltage generator 325 may be implemented by actual apparatuses such as an ASIC, FPGA 907 (see FIG. 11), and other electric circuits.

<3. Linear Motor Magnetic Pole Arrangement in Moving Direction Cross-Section>

Figure 4:
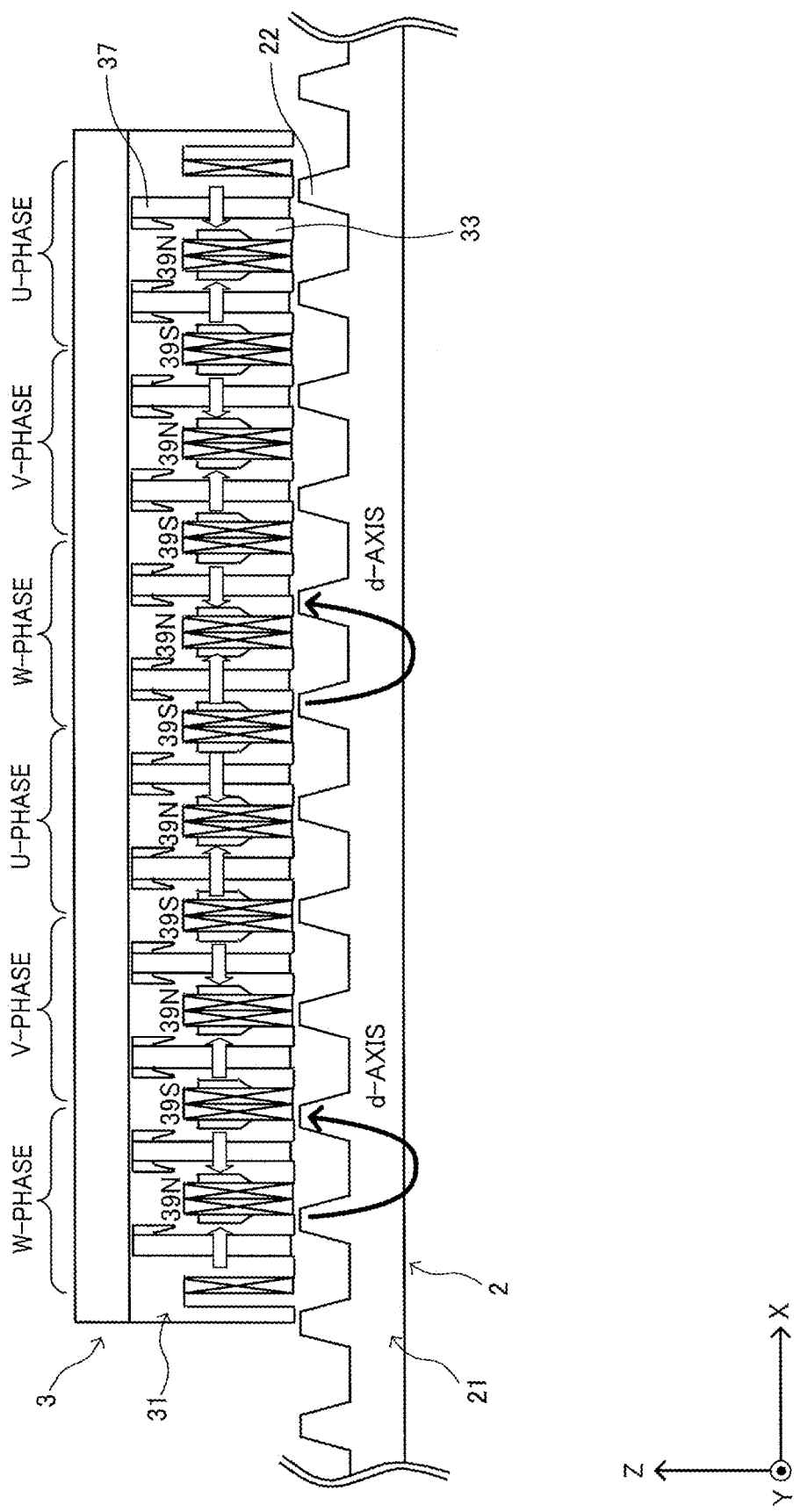
FIG. 4 is an explanatory view of an example of a mover pole placement in the section in the moving direction.

Referring then to FIG. 4, a magnetic pole arrangement of the mover 3 in the moving direction cross-section will be described. As described above, the linear motor 1 of this embodiment is configured so that the mover 3 includes the plurality of teeth 33 and the plurality of magnetic pole portions 39.

In this example, the adjoining two teeth 33 in phase of the mover 3 have opposite winding directions of the armature windings 38. The adjoining two teeth 33 in pairs correspond to the same current phase. For each of the pairs, the current phases U, V, and W are arranged in sequence along the moving direction (negative direction of X-axis in this example). That is, the adjoining two pairs of teeth 33 generate alternating magnetic fields with electrically 120 degrees shifted (note that the amplitudes of the phases vary in accordance with the displacement of d-axis and q-axis that will be described later, along with the movement of mover 3). In the mover 3 of this embodiment having twelve (six pairs of) teeth 33, two pairs of teeth 33 correspond to the phases U, V, and W of the three-phase alternating current supplied.

The plurality of field magnets 37 are magnetized in the directions (directions indicated by block arrows in FIG. 4) where the adjacent two field magnets 37 in phase face each other. As a result, the adjacent magnetic pole portions 39 having N poles facing each other form an N-type magnetic pole portion 39N. The adjacent magnetic pole portions 39 having S poles facing each other form an S-type magnetic pole portion 39S. These N-type magnetic pole portion 39N and S-type magnetic pole portion 39S are arrayed alternately along the moving direction of the mover iron core 31

Let d-axis be an axis extending toward the center of the stator tooth 22 where the magnet flux is most interlinked with the armature winding, while let q-axis be an axis (at a position of the stator tooth 22 where the magnet flux is least interlinked) extending in a direction 90 degrees shifted from d-axis in electrical angle. In the example shown in FIG. 4, the W-phase mover tooth 33 and stator tooth 22 face each other so that the magnet flux is most interlocked with the W-phase armature winding, whereupon the center position of this stator tooth 22 is regarded as d-axis.

<4. Linear Motor Magnetic Flux Distribution in Moving Direction Cross-Section>

Figure 5:
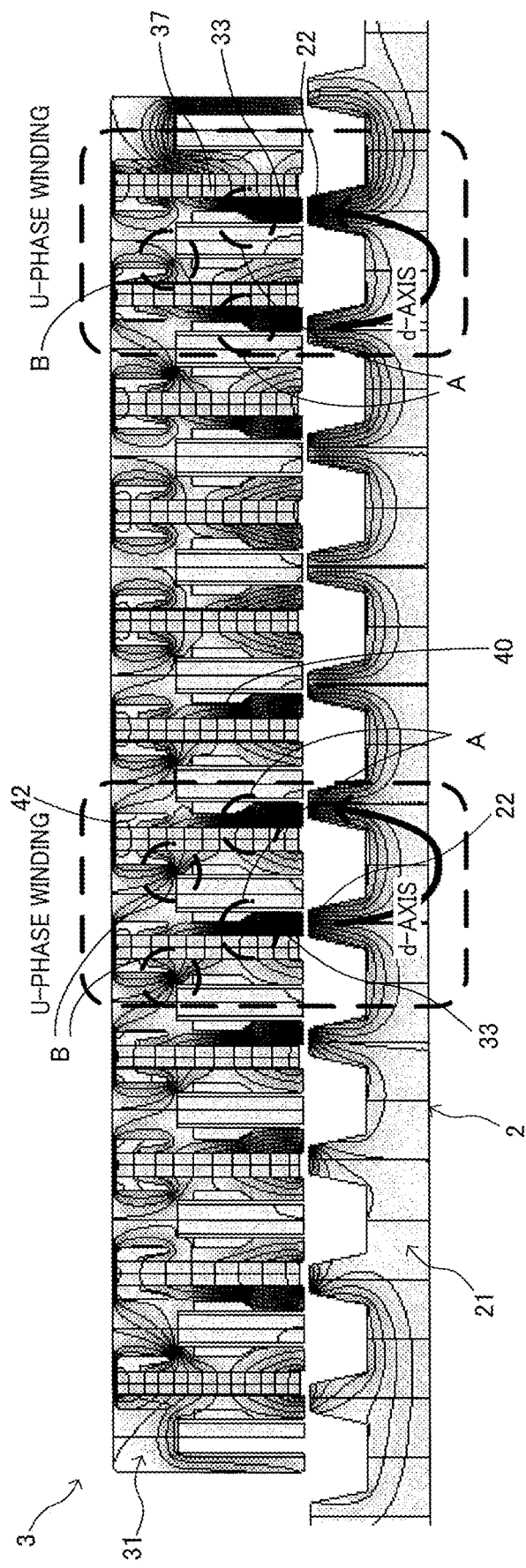
FIG. 5 is a view showing an example of a magnetic flux distribution when U-phase coincides with d-axis in an unloaded state.
Figure 6:
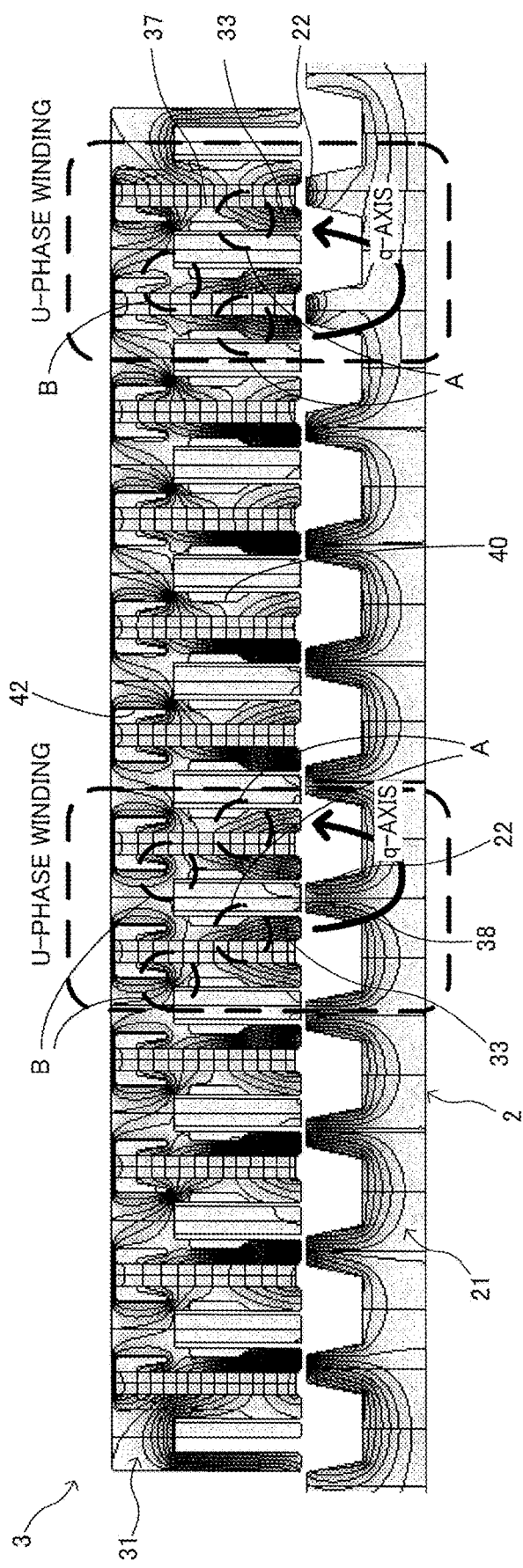
FIG. 6 is a view showing an example of the magnetic flux distribution when U-phase coincides with q-axis in the unloaded state.

FIGS. 5 and 6 show an example of the magnetic flux generation distribution in the linear motor 1 having the magnetic pole arrangement as described above. Although in the three-phase motor, an alternating current having 120 degrees phase differences is applied to the U, V, and W phases, FIGS. 5 and 6 show the magnetic flux distribution in the state where no current is applied to the U, V, and W phases.

The example of FIG. 5 shows the state where during the movement of the mover 3, two teeth 33 in two U phases lie at positions approximately facing two stator teeth 22 of the stator 2, with the teeth 33 in U phases being approximately coincident with d-axes. In this case, two teeth 33 in two V phases and two W phases, respectively, lie at approximately intermediate positions between two stator teeth 22 of the stator 2, with V phase and W phase being approximately 30 degrees shifted from q-axis in electrical angle and lying at positions closer to q-axis.

In this state where U phase coincides with d-axis, a magnetic path is formed where a magnetic flux leaving the field magnet 37 on one hand in U phase enters from the tooth 33 on one hand into the stator tooth 22 on one hand of the stator 2, and enters through the stator iron core 21 from the stator tooth 22 on the other into the tooth 33 on the other, flowing into the field magnet 37 on the other. In this magnetic path, the positions of A portions of the teeth 33 are magnetically saturated due to the decrease in the cross-sectional area achieved by the first holes 40. This results in a reduction in U-phase d-axis inductance Ld. Furthermore, in a magnetic path of a leakage flux flowing from the field magnet 37 on the other in U phase through the bridge 32a (see FIG. 8 described later) into the field magnet 37 on one hand, positions of portions B of the teeth 33 are magnetically saturated due the decrease in the cross-sectional area achieved by the first holes 40 and the second holes 42 (or may be the slots 36). This results in a further reduction in U-phase d-axis inductance Ld.

Similarly, when V phase is approximately coincident with d-axis along with the movement of the mover 3, V-phase d-axis inductance Ld decreses, while when W phase is approximately coincident with d-axis, W-phase d-axis inductance Ld decreses.

The example of FIG. 6 shows the state where during the movement of the mover 3, two teeth 33 in two U phases lie at positions approximately facing two stator teeth 22 of the stator 2, with the teeth 33 in U phases being approximately coincident with d-axes. In this case, V phase and W phase are approximately 30 degrees shifted from d-axis in electrical angle and lying at positions closer to d-axis.

In this state where U phase coincides with q-axis, a magnetic circuit is not formed where a magnetic flux leaving the field magnet 37 on one hand in U phase flows through the stator iron core 21 of the stator 2 into the field magnet 37 on the other. For this reason, the magnetic saturation is alleviated regardless of a decrease in the cross-sectional area by the first holes 40 at positions of portions A of the teeth 33, while the magnetic saturation is alleviated regardless of a decrease in the cross-sectional area by the first holes 40 and the second holes 42 (or slots 36 are also available). This results in an increase in U-phase q-axis inductance Lq.

Similarly, when V phase is approximately coincident with q-axis along with the movement of the mover 3, V-phase q-axis inductance Ld increases, while when W phase is approximately coincident with q-axis, W-phase q-axis inductance Ld increases.

Summarizing the above, since the teeth 33 in d-axis direction are magnetically saturated, a magnetic flux generated by the superimposed voltage hardly passes therethrough (d-axis inductance decreases). On the other hand, since the teeth 33 in the vicinity of q-axis do not undergo the magnetic saturation, the magnetic flux generated by the superimposed voltage can pass therethrough more easily than the teeth 33 in d-axis direction (q-axis inductance increases).

<5. Influences of Formation of First and Second Holes on Magnetic Saliency Ratio>

Let $\rho$, Lq, and Ld be a magnetic pole saliency ratio (referred to also as "magnetic saliency ratio") of the mover 3, q-axis inductance, and d-axis inductance, respectively, $$\rho = Lq/Ld \quad (1)$$

is obtained. As described above, in order to detect the magnetic pole position x of the linear motor 1 at a high accuracy in the sensorless control, that mover 3 is required to have a high magnetic pole saliency ratio $\rho$.

In this case, inductance L is defined from magnetic flux $\varphi$ and current i by Equation (2), and becomes larger according as the magnetic flux generated for the current increases.

$$\varphi = Li \quad (2)$$

Since the relationship among voltage v, current i, and inductance L is expressed by Equation (3), the alternating current has an increased time deviation according as the inductance becomes smaller for a certain alternating current.

$$v = d\varphi/dt = Ldi/dt \quad (3)$$

Utilizing the above natures of the inductance, in the sensorless control, a rectangular wave voltage (an example of a high-frequency voltage) output from the rectangular wave voltage generator 325 is superimposed on the two-phase voltage command values $\Delta Vsd^*$, $\Delta Vsq^*$. The magnetic pole position x is then estimated based on the amplitude deviation between the two-phase current values is$\alpha$, is$\beta$ occurring from the inductance deviation between d-axis and q-axis.

In the example of this embodiment, the teeth 33 in d-axis direction coinciding with the phase (U phase in the example shown in FIG. 5) where the instantaneous current values are 0 are most magnetically saturated, i.e., result in d-axes with minimum inductances. The teeth 33 in the vicinity of q-axis direction in phases (V phase and W phase in the example shown in FIG. 5) through which the instantaneous current values flow are hardly magnetically saturated, resulting in q-axes with large inductances. The d-axis inductance Ld (denominator of Equation (1)) and the q-axis inductance Lq (numerator of Equation (1)) in the entire mover 3 are respectively the total amount of d-axis inductances of a plurality of coils and the total amount of q-axis inductances of a plurality of coils.

In order to impart a driving torque to the mover 3, only load currents of q-axis components may be applied thereto (d-axis components do not influence the torque). However, if q-axis component load currents are increased to a large extent, the magnetic saturation of the mover iron core 31 increases, with the result that the magnetic pole saliency ratio $\rho$ attributable to the mover iron core shape decreases. This results in lowering in the detection accuracy of the magnetic pole position x of the linear motor 1.

On the contrary, to increase the magnetic pole saliency ratio $\rho$ of the linear motor 1, the magnetic saturation of the teeth 33 may be utilized for the increase of the magnetic pole saliency ratio $\rho$. That is, d-axis inductance coinciding with the phase (U phase in the example shown in FIG. 5) where the instantaneous current value is 0 may further be reduced, whereas q-axis inductances in two phases (V phase and W phase in the example shown in FIG. 5) where the instantaneous current values flow may further be increased.

Thus, in this embodiment, the teeth 33 are configured so that, in the non-energized state (hereinafter, referred to properly as "no load state", the teeth 33 facing the stator teeth 22 of the stator 2 become approximately magnetically saturated by only a certain magnetic flux from the filed magnets 37. As specific means therefor, the first hole 40 is formed in the slot 36 of tooth 33 so that the tooth 33 facing the stator tooth 22 is approximately magnetically saturated. This enables the portion of the tooth 33 where the first hole 40 is formed to have a reduced cross-sectional area. The first hole 40 is dimensioned and shaped in the moving direction so that, in the non-energized state of the armature windings 38, the tooth 33 facing the stator tooth 22 is approximately magnetically saturated by the field magnet 37 at the position where first hole 40 is formed. This increases the magnetic flux density arising from the field magnet 37 at the portion where the first hole 40 is formed of the tooth 33 facing the stator tooth 22 in the non-energized state of the armature windings 38, thereby achieving substantial magnetic saturation. It is thereby possible to suppress the d-axis inductance to a smaller value.

The above configuration where the tooth 33 has the first hole 40 formed so as to be approximately magnetically saturated by the field magnet 37 in the non-energized state of the armature windings 38, corresponds to an example of the means for saturating approximately magnetically a tooth facing a stator tooth of the stator in a magnetic gap direction among the plurality of teeth in a non-energized state of the armature winding.

In general, the electromagnetic steel sheet making up the tooth 33 has magnetic saturation characteristics as shown in B-H curve of FIG. 7. That is, if the magnetic field strength applied to the electromagnetic steel sheet increases gradually from 0, the magnetic flux density rises so as to be approximately proportional thereto during low magnetic field strengths. However, if the magnetic field strength exceeds a certain level, the rising rate of the magnetic flux density lowers, finally with the result that the magnetic flux density can hardly rise. In this embodiment, the state where the magnetic flux density is equal to or more than 1.9 T (tesla) for example is called "approximately magnetically saturated" state. The magnetic flux density of the approximately magnetically saturated state is not limited to this value, but it may properly be changed in accordance with e.g., the materials making up the teeth 33.

As a result, at the d-axis positions coinciding with the phase (U phase in the example shown in FIG. 5) where the instantaneous current value is 0, the tooth 33 facing the stator tooth 22 is approximately magnetically saturated by only the certain magnetic flux from the field magnet 37 (the magnetic flux can hardly pass therethrough), so that the inductance can be minimized. That is, the total amount Ld of the d-axes inductances of the entire mover 3 can be reduced. In the vicinity of the positions of q axis in two phases (V phase and W phase in the example shown in FIG. 5) where the instantaneous current flows, the tooth 33 facing the intermediate position between two stator teeth 22 weakens the magnetic saturation, consequently enabling the inductance to be increased. Thus, the total amount Lq of the q-axes inductances of the entire mover 3 can be increased. From the above, the denominator (Ld ρ) of the right side of the equation (1) becomes small, whereas the numerator (Lq) of the right side becomes large, thereby enabling the mover 3 to have an increased magnetic pole saliency ratio ρ.

<6. Effects of Embodiment>

As described above, the linear motor 1 of this embodiment is the linear motor whose mover 3 has the field magnets 37 and the armature windings 38. The plurality of teeth 33 of the mover 3 have the first holes 40 formed in the slots 36 housing the armature windings 38, with the result that the cross-sectional area of the tooth 33 at the portions where the first holes 40 are formed can be reduced. This increases the magnetic flux density arising from the field magnets 37 at the portions where the holes 40 are formed of the tooth 33 facing the stator tooth 22 of the stator 2 in the magnetic gap direction in the non-energized state of the armature windings 38, thereby achieving a substantial magnetic saturation. Hence, the d-axis inductance Ld can be suppressed to a smaller value. Accordingly, a high saliency ratio can be obtained, making the sensorless design feasible.

In this embodiment in particular, the first hole 40 is formed at a position apart from the end of the tooth 33 toward the stator 2. This can secure the gap area of the tooth 33 facing the stator 2 so that the reduction of the thrust characteristics can be suppressed.

In this embodiment in particular, the mover iron core 31 has at its both end positions in the moving direction the sub-teeth 34 around which no armature windings 38 are wound, with the teeth 33 adjoining the sub-teeth 34 having the first holes 40 in only the slots 36 opposite to the sub-teeth 34. This presents the following effects.

That is, since the mover iron core 31 has the sub-teeth 34 at its both end positions, the cogging thrust can be reduced. The tooth 33 adjoining the sub-tooth 34 among the plurality of teeth 33 has the first hole 40 in only the slot opposite to the sub-tooth 34 but does not have the first hole 40 in the slot closer to the sub-tooth 34. This can increase the magnetic flux passing through the sub-teeth 34, securing the cogging reduction effect.

In this embodiment in particular, the first hole 40 is formed so that in the non-energized state of the armature windings 38, the tooth 33 facing the stator tooth 22 of the stator 2 in the magnetic gap direction is approximately magnetically saturated by the field magnets 37 at positions where the first hole 40 is formed.

It is thus possible to suppress the d-axis inductance Ld to a smaller value to obtain a higher saliency ratio, achieving the sensorless design.

In this embodiment in particular, the mover iron core 31 has the yoke 32 arranged opposite to the stator 2 with respect to the slot 36 to connect the plurality of teeth 33 together, the magnet insertion hole 35 for receiving the field magnet 37, extending from the tooth 33 toward the yoke 32 along the magnetic gap direction in each of the plurality of teeth, and the second hole 42 formed in the yoke 32 on at least one side of the magnet insertion hole 35 in the moving direction. This presents the following effects.

That is, by forming the second hole 42 in the magnet insertion hole 35 toward the moving direction, it becomes possible to reduce the leakage flux flowing through the bridge 32a of the yoke 32 opposite to the stator 2 with respect to the magnet insertion hole 35, as shown in FIG. 8, thus enabling an improvement in the motor characteristics.

In this embodiment in particular, the second hole 42 is formed in communication with the end of the magnet insertion hole 35 opposite to the stator 2.

Such a formation of the second hole 42 in communication with the magnet insertion hole 35 enables the length of the bridge 32a to be increased, so that the leakage flux reduction effect can be enhanced.

In this embodiment in particular, the second hole 42 is formed in the magnet insertion hole 35 of the tooth 33 adjoining the sub-tooth, only opposite to the sub-tooth 34.

In this manner, this embodiment allows the magnet insertion hole 35 of the tooth 33 adjoining the sub-tooth among the plurality of teeth 33 to have the second hole 42 only on the opposite side to the sub-tooth, with no second hole 42 on the side toward the sub-tooth. This enables an increase in the magnetic flux passing through the sub-tooth. The cogging reduction effect presented by the sub-tooth 34 can thus be ensured.

In this embodiment in particular, the second hole 42 is formed so that in the non-energized state of the armature windings 38, the tooth 33 facing the stator tooth 22 of the stator 2 in the magnetic gap direction is subsequently magnetically saturated between the second hole 42 and the first hole 40 by the field magnet 37.

In this manner, this embodiment can further reduce the d-axis inductance Ld to further increase the saliency ratio, by virtue of the synergy between the magnetic saturation effect provided by the first hole 40 and the magnetic saturation effect provided by the second hole 42.

<6-1. Simulation Results>

Figure 9A:
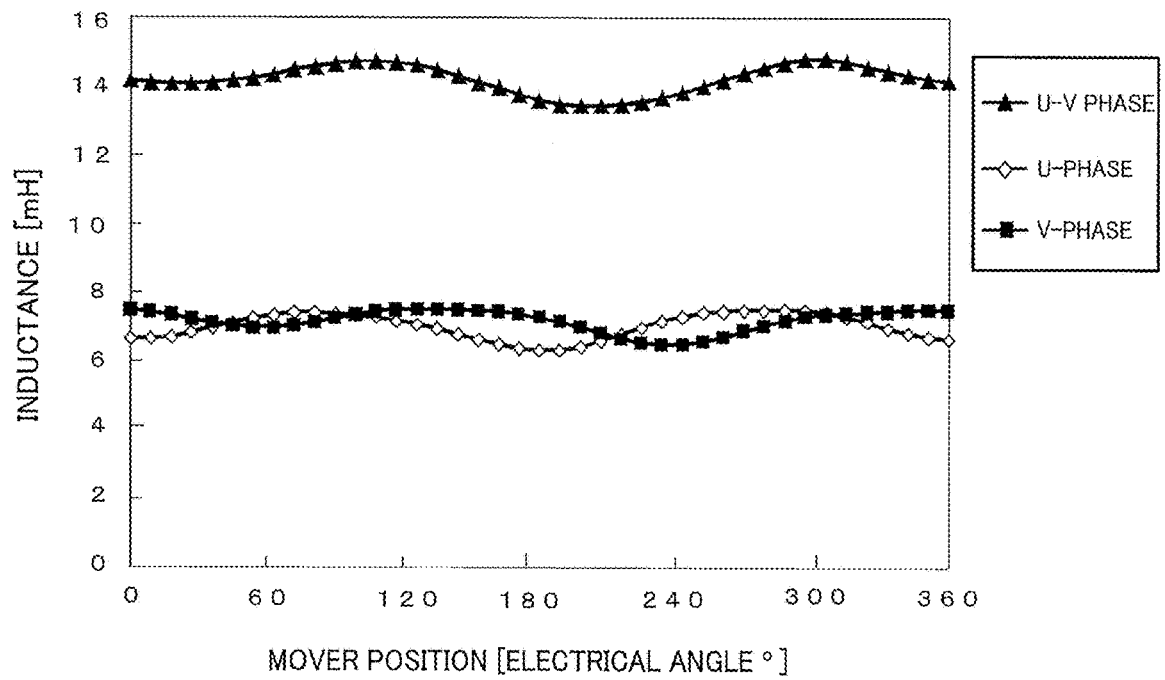
FIG. 9A is a graphic representation showing an example of changes of a high-frequency inductance in a comparative example in the case of superimposed input of exploration signals.
Figure 9B:
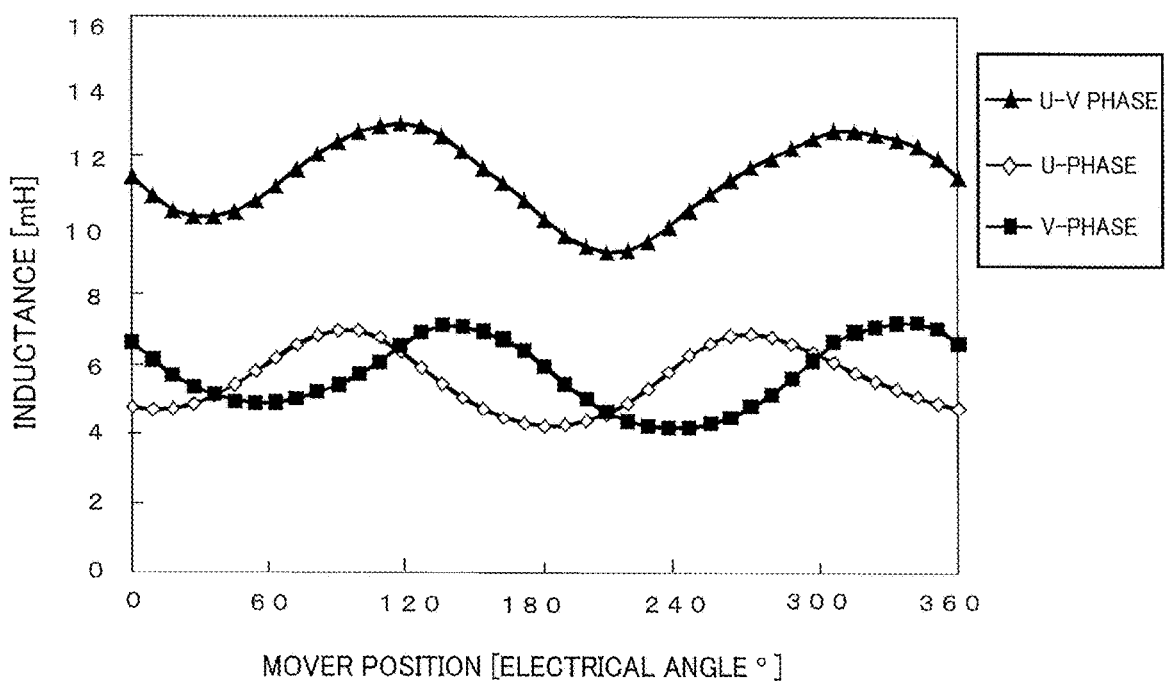
FIG. 9B is a graphic representation showing an example of changes of the high-frequency inductance in an embodiment in the case of superimposed input of the exploration signals.

The above effects of this embodiment will be described using simulation results. FIG. 9A shows an example of the results of the high-frequency inductance variations in a comparative example where the tooth 33 has no holes, while FIG. 9B shows an example of the results of the high-frequency inductance variations in this embodiment where the tooth 33 has holes (first hole 40 and second hole 42). The high-frequency inductance variations are high-frequency inductance variations in the case where exploration signals are superimposedly input between the U-V phases in the non-energized state of the armature windings 38. The horizontal axis of the graph represents a mover position over a 360-degree electrical angle range. The vertical axis of the graph represents a high-frequency inductance, which corresponds to likelihood of flowing of high-frequency magnetic flux generated by a high-frequency voltage signal. In FIG. 9A, a curve plotted by white diamonds indicates a U-phase inductance variation, a curve plotted by black squares indicates a V-shape inductance variation, and a curve plotted by black triangles is indicative of a U-V phase inductance variation obtained by adding U-phase inductances and V-phase inductances together.

In the comparative example, as shown in FIG. 9A, the d-axis high-frequency inductance varies approximately sinusoidally in both U phase and V phase, with relatively small variations in their amplitudes. The ratio (maximum/minimum) of a maximum value to a minimum value in these sinusoids corresponds to the magnetic pole saliency ratio $\rho$. This means that the magnetic pole saliency ratio $\rho$ becomes high according as the sinusoidal amplitude increases. In the case of the comparative example, as shown, the magnetic pole saliency ratio $\rho$ is as small as approx. 1.1 in both U phase and V phase.

In this embodiment, as shown in FIG. 9B, the d-axis high-frequency inductance varies approximately sinusoidally in both U phase and V phase, with their amplitude variations being relatively large. In the case of this embodiment, as shown, the magnetic pole saliency ratio $\rho$ is approx. 1.4 that is much larger than the comparative example.

Figures 10A, 10B:
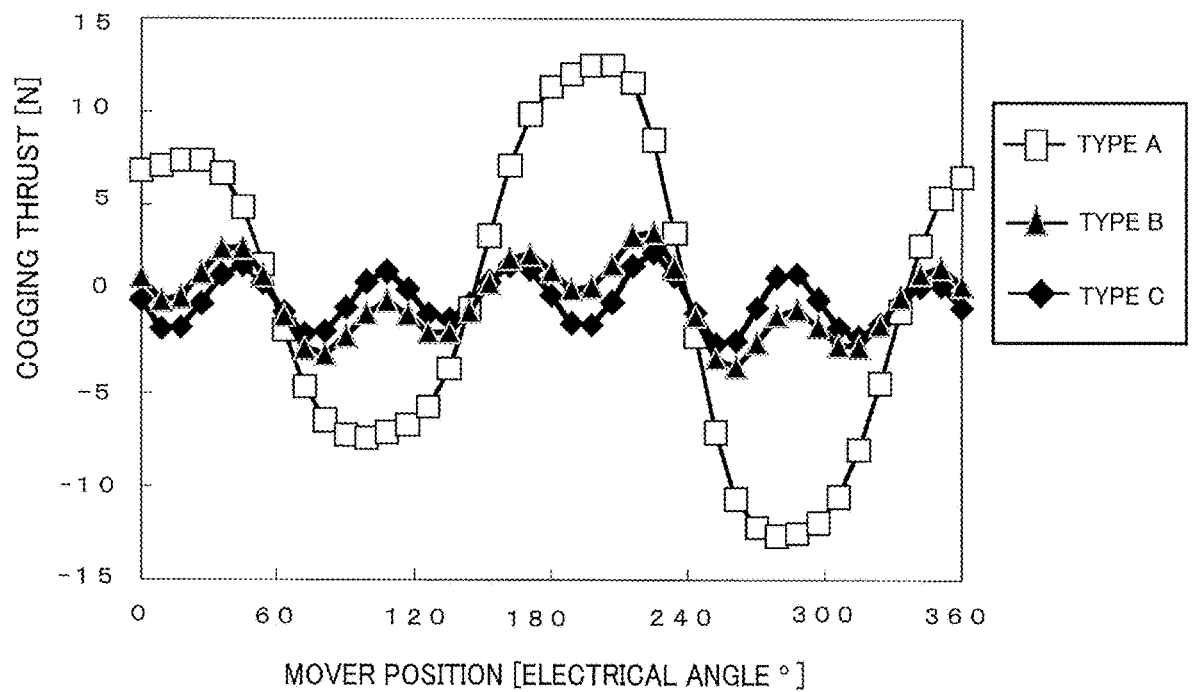
FIG. 10A is a graphic representation showing an example of changes of cogging thrust based on differences in conditions of a mover iron core such as presence/absence of holes in teeth.
FIG. 10B is a table showing an example of the conditions of the mover iron core and an example of numerical values in a maximum width of the cogging thrust.

FIG. 10A is curve showing an example of variations in cogging thrust based on the difference of conditions of the mover iron core 31 such as presence or absence of the holes in the tooth 33, while FIG. 10B is a table showing an example of the conditions of the mover iron core 31 and the maximum cogging thrust. The horizontal axis of FIG. 10A represents a mover position over a 360-degree electrical angle range, similar to FIGS. 9A and 9B. The vertical axis of FIG. 10A represents a positive cogging thrust toward one side in the moving direction with center at 0 and a negative cogging thrust toward the other side in the moving direction.

As shown in FIG. 10B, type A is a case of the comparative example where the hole (first hole 40) is formed in all of the slots 36 of the teeth 33 of the mover iron core 31, with the mover iron core 31 having no sub-teeth on both ends of the plurality of teeth 33 in the moving direction. Type B is a case of the comparative example where the mover iron core 31 has the sub-teeth 34 on both ends of the plurality of teeth 33 in the moving direction, with the holes (first holes 40) being formed in not only the slots 36 of all of the teeth but also in the slots toward the sub-teeth 34. Type C is a case of this embodiment where the mover iron core 31 has the sub-teeth 34 on both ends of the plurality of teeth 33 in the moving direction, with the holes (first holes 40) being formed in all of the teeth, without holes formed in the slots 36 toward the sub-teeth 34.

Type A cannot obtain the cogging reduction effect provided by the sub-teeth lying on both ends in the moving direction, due to absence of the sub-teeth 34 on both ends in the moving direction. In type A, as shown in FIG. 10A, the cogging thrust variations are large relative to the displacement of the mover position, and as shown in FIG. 10B, the maximum width (peak-to-peak value) of the cogging thrust is as a large value as 25.2 [N]. Type B can obtain a cogging reduction effect provided by the sub-teeth lying on both sides in the moving direction, due to the presence of the sub-teeth on both ends in the moving direction. However, presence of the first holes 40 in the slots 36 toward the sub-teeth reduces the magnetic flux flowing into the sub-teeth 34, impeding sufficient exertion of the cogging reduction effect provided by the sub-teeth on both sides in the moving direction. For this reason, type B has a relatively large cogging thrust variation relative to the displacement of the mover position as shown in FIG. 10A and shows as a relatively large cogging thrust maximum width as 7.2 [N] as shown in FIG. 10B. Type C can prevent the magnetic flux flowing into the sub-teeth 34 from being reduced by the first holes 40, due to no formation of the first holes 40 in the slots 36 toward the sub-teeth 34, so that the cogging reduction effect can be ensured. For this reason, type C has a small cogging thrust variation relative to the displacement of the mover position as shown in FIG. 10A, and shows as a relatively small cogging thrust maximum width as 4.9 [N] as shown in FIG. 10B. From the above, the configuration of this embodiment achieves a maximum cogging reduction effect.

In addition, techniques by the embodiment may be appropriately combined and utilized in addition to the examples having already described above. In addition to that, although exemplification is not performed one by one, the embodiment is carried out by various changes being applied thereto without departing from the spirit of the present disclosure.

<7. Hardware Configuration Example of Control Apparatus>

Figure 11:
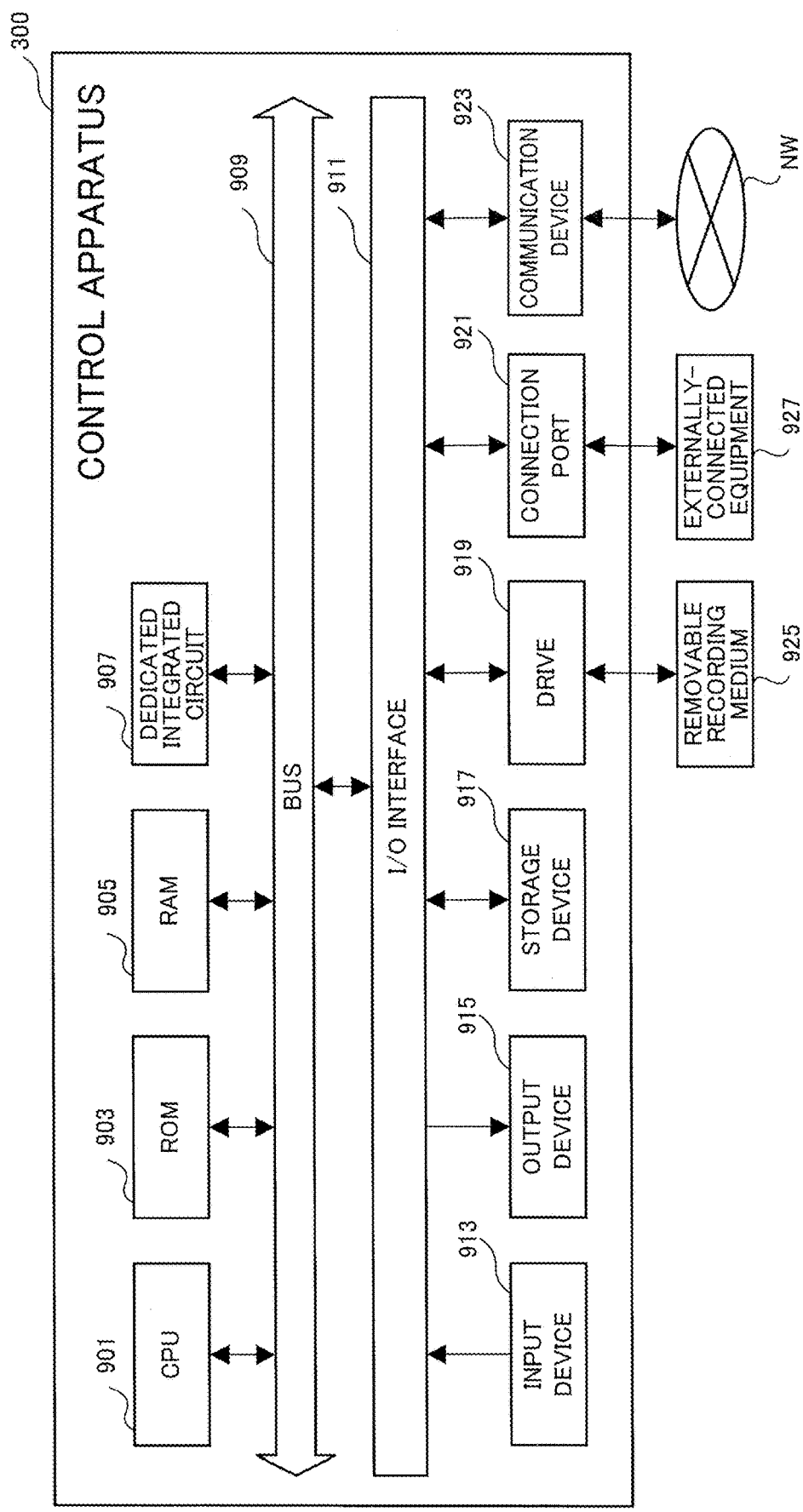
FIG. 11 is a block diagram showing a hardware configuration example of the control apparatus.

Referring then to FIG. 11, a hardware configuration example will be described of the control apparatus 300 executing processes of the voltage controller 323, the rectangular wave voltage generator 325, etc., implemented by a program run by the CPU 901 described hereinabove. In FIG. 11, the control apparatus 300 is shown with proper deletion of a configuration in relation to a function of supplying driving electric power to the linear motor 1.

As shown in FIG. 11, the control apparatus 300 has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in a recording device such as the ROM 903, the RAM 905, and the storage device 917, for example.

The program can also temporarily or permanently be recorded in a removable recording medium 925 such as various optical disks including CDs, MO disks, and DVDs, and semiconductor memories. The removable recording medium 925 as described above can be provided as so-called packaged software. In this case, the program recorded in the removable recording medium 925 may be read by the drive 919 and recorded in the recording device through the I/O interface 911, the bus 909, etc.

The program may be recorded in, for example, a download site, another computer, or another recording medium (not shown). In this case, the program is transferred through a network NW such as a LAN and the Internet and the communication device 923 receives this program. The program received by the communication device 923 may be recorded in the recording device through the I/O interface 911, the bus 909, etc.

The program may be recorded in appropriate externally-connected equipment 927, for example. In this case, the program may be transferred through the appropriate connection port 921 and recorded in the recording device through the I/O interface 911, the bus 909, etc.

The CPU 901 executes various process in accordance with the program recorded in the recording device to implement the processes of the voltage controller 323, the rectangular wave voltage generator 325, etc (for example, the first step for imparting a high-frequency voltage to at least one of the d-axis and the q-axis, and the second step for imparting a load current to the q-axis). In this case, the CPU 901 may directly read and execute the program from the recording device or may be execute the program once loaded in the RAM 905. In the case that the CPU 901 receives the program through, for example, the communication device 923, the drive 919, or the connection port 921, the CPU 901 may directly execute the received program without recording in the recording device.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result to the communication device 923 or the connection port 921 as needed or may record the process result into the recording device or the removable recording medium.

Obviously, numerous modifications and variations of the present invention are possible in light of the above teachings. It is therefore to be understood that within the scope of the appended claims, the invention may be practiced otherwise than as specifically described herein.

What is claimed is:

1. A linear motor, comprising:
   a stator; and
   a mover comprising a mover iron core, a plurality of teeth formed in the mover iron core such that the plurality of teeth is protruding toward the stator, a plurality of field magnets positioned in the plurality of teeth, respectively, and a plurality of armature windings wound around the plurality of teeth respectively such that each of the armature windings is housed in a slot formed between adjoining teeth of the plurality of teeth,
   wherein the plurality of teeth includes at least one tooth having a first hole formed in the slot housing a respective one of the armature windings, and the first hole formed in the tooth is forming a thin tooth portion such that the thin tooth portion has a cross-sectional area which is smaller than a cross-sectional area of an end portion of the tooth facing the stator.

2. The linear motor according to claim 1, wherein the tooth is formed such that the first hole is formed at a position apart from an end of the tooth facing the stator.

3. The linear motor according to claim 2, wherein the mover iron core comprises two sub-teeth formed at end positions in a moving direction of the mover, respectively, such that the mover does not have the armature windings on the sub-teeth, and each of the teeth adjoining the sub-teeth has the first hole formed only in the slot on an opposite side with respect to a respective one of the sub-teeth.

4. The liner motor according to claim 3, wherein the first hole of the tooth is formed such that a respective one of the field magnets in the tooth magnetically saturates the tooth at a position of the first hole when the armature winding is in a non-energized state and the tooth is facing a stator tooth formed in the stator in a magnetic gap direction.

5. The linear motor according to claim 4, wherein the mover iron core comprises a yoke connecting the plurality of teeth together and has a plurality of magnet insertion holes extending in the plurality of teeth toward the yoke in the magnetic gap direction such that the plurality of field magnets is positioned in the plurality of magnet insertion holes, respectively, and the yoke of the mover iron core is formed such that each of the magnet insertion holes has at least one second hole formed in the moving direction of the mover.

6. The linear motor according to claim 5, wherein the second hole is formed in a respective one of the magnetic insertion holes such that the second hole is positioned at an end portion of the respective one of the magnetic insertion holes on an opposite side with respect to the stator.

7. The linear motor according to claim 6, wherein the teeth adjoining the sub-teeth have the magnet insertion holes formed such that each of the magnet insertion holes has the second hole formed only on the opposite side with respect to the respective one of the sub-teeth.

8. The linear motor according to claim 7, wherein the second hole of the tooth is formed such that the respective one of the field magnets magnetically saturates a portion of the tooth between the second hole and the first hole when the armature winding is in a non-magnetized state and the tooth is facing the stator tooth formed in the stator in the magnetic gap direction.

9. The linear motor according to claim 1, wherein the thin tooth portion has a width in a moving direction of the mover such that the width of the thin tooth portion is smaller than a width of the end of the tooth facing the stator.

10. The linear motor according to claim 1, wherein the mover iron core comprises two sub-teeth formed at end positions in a moving direction of the mover, respectively, such that the mover does not have the armature windings on the sub-teeth, and the plurality of teeth is formed such that teeth adjoining the sub-teeth have a width which is greater than a width of teeth not adjoining the sub-teeth where the widths are measured in the moving direction.

11. The linear motor according to claim 9, wherein the tooth is formed such that the first hole is formed at a position apart from an end of the tooth facing the stator.

12. The linear motor according to claim 1, wherein the mover iron core comprises two sub-teeth formed at end positions in a moving direction of the mover, respectively, such that the mover does not have the armature windings on the sub-teeth, and each of the teeth adjoining the sub-teeth has the first hole formed only in the slot on an opposite side with respect to a respective one of the sub-teeth.

13. The liner motor according to claim 1, wherein the first hole of the tooth is formed such that a respective one of the field magnets in the tooth magnetically saturates the tooth at a position of the first hole when the armature winding is in a non-energized state and the tooth is facing a stator tooth formed in the stator in a magnetic gap direction.

14. The linear motor according to claim 1, wherein the mover iron core comprises a yoke connecting the plurality of teeth together and has a plurality of magnet insertion holes extending in the plurality of teeth toward the yoke in the magnetic gap direction such that the plurality of field magnets is positioned in the plurality of magnet insertion holes, respectively, and the yoke of the mover iron core is formed such that each of the magnet insertion holes has at least one second hole formed in the moving direction of the mover.

15. The linear motor according to claim 14, wherein the second hole is formed in a respective one of the magnetic insertion holes such that the second hole is positioned at an end portion of the respective one of the magnetic insertion holes on an opposite side with respect to the stator.

16. The linear motor according to claim 15, wherein the mover iron core comprises two sub-teeth formed at end positions in a moving direction of the mover, respectively, such that the mover does not have the armature windings on the sub-teeth, and each of the teeth adjoining the sub-teeth have the magnet insertion holes formed such that each of the magnet insertion holes has the second hole formed only on the opposite side with respect to the respective one of the sub-teeth.

17. The linear motor according to claim 16, wherein the second hole of the tooth is formed such that the respective one of the field magnets magnetically saturates a portion of the tooth between the second hole and the first hole when the armature winding is in a non-magnetized state and the tooth is facing the stator tooth formed in the stator in the magnetic gap direction.

18. The linear motor according to claim 3, wherein the thin tooth portion has a width in a moving direction of the mover such that the width of the thin tooth portion is smaller than a width of the end of the tooth facing the stator.

* * * * *